United States Patent [19]
Barnhouse et al.
[11] Patent Number: 4,660,272
[45] Date of Patent: Apr. 28, 1987

[54] LOCALIZED REMOVAL OF A PRECIOUS METAL INLAY FROM A METAL STRIP AND A BROACHING TOOL THEREFOR

[75] Inventors: Robert L. Barnhouse, Royal Palm Beach; James C. Elo, North Lauderdale; George F. Mattison, Jr., Pompano Beach; Marshall Hart, Palm Beach Gardens, all of Fla.

[73] Assignee: Northern Telecom Limited, Montreal, Canada

[21] Appl. No.: 879,374

[22] Filed: Jun. 27, 1986

[51] Int. Cl.[4] .......... B23D 1/26; B23R 13/04

[52] U.S. Cl. .......... 29/558; 29/564.7; 409/293; 409/326

[58] Field of Search .......... 409/281, 265, 317, 334, 409/336, 326, 347, 348, 244, 293; 29/566.2, 564.6, 564.7, 558, 557, 566.3

[56] References Cited

U.S. PATENT DOCUMENTS

| | | | |
|---|---|---|---|
| 1,775,963 | 9/1930 | McCarroll | 409/326 |
| 2,326,922 | 8/1943 | Bieler | 409/347 |
| 2,744,451 | 5/1956 | Lee | 409/347 |
| 2,905,063 | 9/1959 | Gronan | 409/326 |
| 3,802,040 | 4/1974 | Nomamoto | 29/557 X |
| 4,154,145 | 5/1979 | Bishop | 409/334 |
| 4,409,733 | 10/1983 | Alemanni | 29/564.3 X |
| 4,589,188 | 5/1986 | Houtz et al. | 29/566.2 |

FOREIGN PATENT DOCUMENTS

| | | | |
|---|---|---|---|
| 261092 | 7/1912 | Fed. Rep. of Germany | 409/326 |

*Primary Examiner*—William R. Briggs
*Attorney, Agent, or Firm*—Schwartz, Jeffery, Schwaab, Mack, Blumenthal & Evans

[57] ABSTRACT

In the manufacture of terminals, a stripe of precious metal is inlayed into a strip of metal from which terminals are formed. The precious metal is only required at the localities at which dimpled contact areas are to be formed. The invention provides for the removal of the inlay at spaced apart localities. A tool is moved laterally across the metal strip, the tool having one or more cutting edges. The cutting edges are inserted into the strip on one side of the stripe, traverses across, cutting the stripe, and then exits from the strip on the other side of the stripe. The tool returns to its original position.

12 Claims, 17 Drawing Figures

LOCALIZED REMOVAL OF A PRECIOUS METAL INLAY FROM A METAL STRIP AND A BROACHING TOOL THEREFOR

BACKGROUND OF THE INVENTION

1. Field of the Invention

This invention relates to the localized removal of a precious metal inlay from a metal strip. In particular, the invention relates to the removal at predetermined positions of a narrow precious metal inlay extending along a metal strip from which terminals are formed, by the use of a broaching tool.

2. Related Art

In telecommunications systems and other electrical and electronic systems, electrical connections are made between cooperating terminals. Particularly, one such connection is between a pin and a female or box terminal. To obtain a high quality connection, small dimples are formed on the contact members. These dimples have been formed in various ways. For example, one way is by spot welding a gold wire in place, cropping and forming. Another way is to locally form a dimple and then gold plate. It is very difficult to restrict the gold plating to the dimple and expensive apparatus is required. In yet another way, a gold stripe is inlayed into a strip of contact metal, for example copper. However, with this latter method a substantial amount of gold remains with the scrap and at unrequired positions of the terminal, after forming the terminals. At the same time the percentage of gold relative to the total scrap is quite low and recovery costs are therefore high.

Instead of forming a dimple in the base strip it has also been proposed to weld a narrow stripe of gold along the strip of contact material, remove the unwanted gold to leave localized pieces of stripe and then form these localized pieces. However the thickness of gold is much greater than necessary and the comparative cost is higher. It is relatively easy to remove the unwanted gold as it projects above the surface of the strip of contact material. This convenience is offset by the more expensive spot formation.

SUMMARY OF THE INVENTION

The present invention provides for the localized removal of a thin precious metal inlay, the removed material having a high precious metal content. The localized contact positions are formed by dimpling the contact metal and gold overlay. Thus it is possible to provide the advantage of a dimpled base material with the desired thickness of gold or other contact material, with the low cost per contact in that the minimum of precious metal per contact is provided. At the same time the thin precious metal inlay is accurately removed where it is not required to give a salvaged scrap having a relatively high content of precious metal, making recovery financially advantageous.

Broadly the invention provides for localized removal of the precious metal inlay, using a broaching tool mounted for movement transversely of the strip of contact material, the tool having one or more cutting edges to remove material at predetermined positions along the strip. Actuation of the tool causes a downward movement of the cutting edge or edges followed by a steady forward movement. Towards the end of the movement the cutting edge or edges move forward and upward. The depth of cut can be accurately controlled. This provides for minimal removal of the base contact strip material. This is required for two reasons, to maintain the precious metal content as high as possible and to maintain the thickness of the base metal strip at a maximum as this forms part of the final terminal. If too much base material is removed, effective forming of terminals can be prevented.

The invention is particularly suited for combining with the press tool used to form the terminals, conveniently being mounted at the inlet end of the press tool and operating with the press tool.

BRIEF DESCRIPTION OF THE DRAWINGS

The invention will be readily understood by the following description in conjunction with the accompanying drawings, in which.

DETAILED DESCRIPTION OF THE EMBODIMENTS

Figure 1:
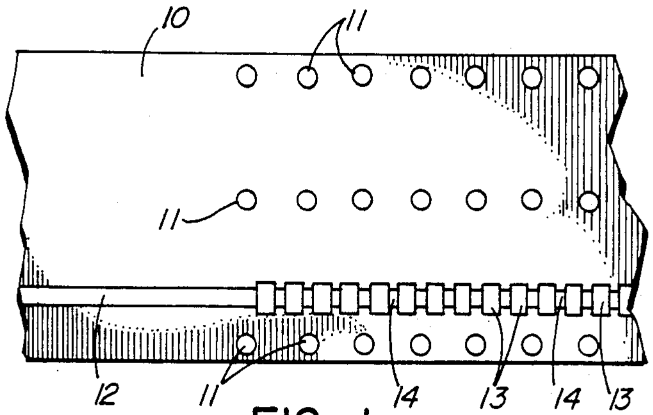
FIGS. 1 and 2 are top plan views of two contact strips illustrating precious metal removal, for two alternate terminal forms.
Figure 2:
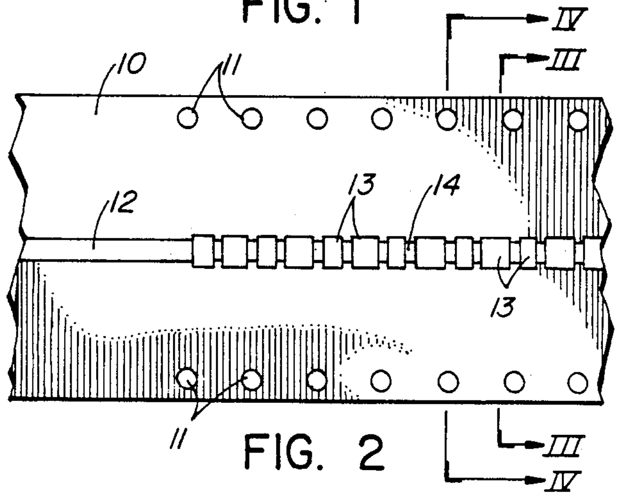

FIGS. 1 and 2 illustrate two alternate forms of contact or terminal strip 10 for example of copper or copper alloy. The strip is perforated, at 11, to provide both feed and locating means for sequential feeding of the strip through a terminal forming punch or die. Extending longitudinally of the strip 10 is an inlay 12 of precious metal, for example gold. On the terminals dimples are formed for contact positions, and the gold inlay is required only at the positions where dimples are to be formed. An example of one form of terminal formed from the strip is described in U.S. Pat. No. 4,076,369 issued on Feb. 28, 1978 to the present assignee. The gold inlay is removed at those positions where dimples will not be formed, those positions being indicated at 13. This leaves localized pieces of inlay, at 14, for the eventual dimple formation.

Figure 3:
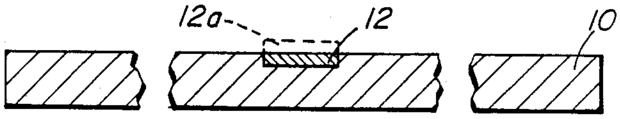
FIGS. 3 and 4 are cross-sections on the lines III—III and IV—IV, respectively, on FIG. 2, to a larger scale.
Figure 4:
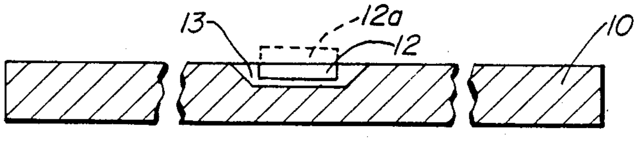

A typical transverse cross-section of a strip 10, with inlay 12, is illustrated in FIG. 3. FIG. 4 illustrates the removed material at 13.

The unwanted material is removed by moving a broaching tool transversely of the strip 10. In previous systems this has been a simple process as the precious metal has extended above the surface of the strip 10 and a simple tool was moved across on the surface of the strip, although it was generally necessary to make transverse cuts in the precious metal strip first to enable clean removal and prevent the precious metal material being completely removed from the strip.

In the present invention the tool is given a downward movement and then moved transversely. As the tool approaches the end of its transverse movement it also moves upward. The downward movement of the tool is arranged to be at, or at a slight distance before the first edge of the precious metal stripe and the upward movement starts at or after the tool edge is at the second edge of the precious metal stripe. This movement is described in conjunction with FIGS. 5, 6, and 7, which illustrate one particular form of the broaching tool.

Figure 5:
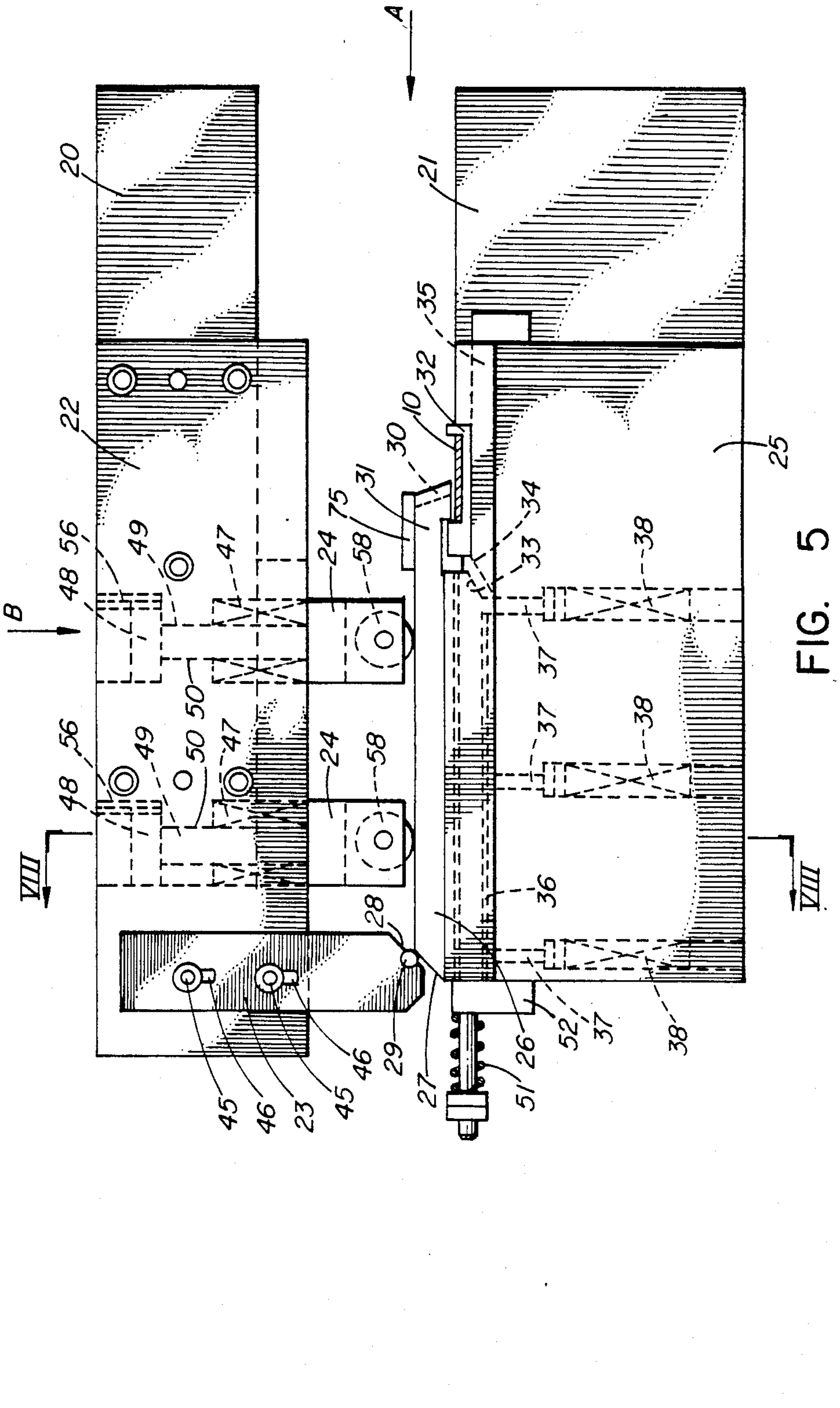
FIG. 5 is a side view of one form of apparatus of the invention at the initiation of a broaching stroke.
Figure 6:
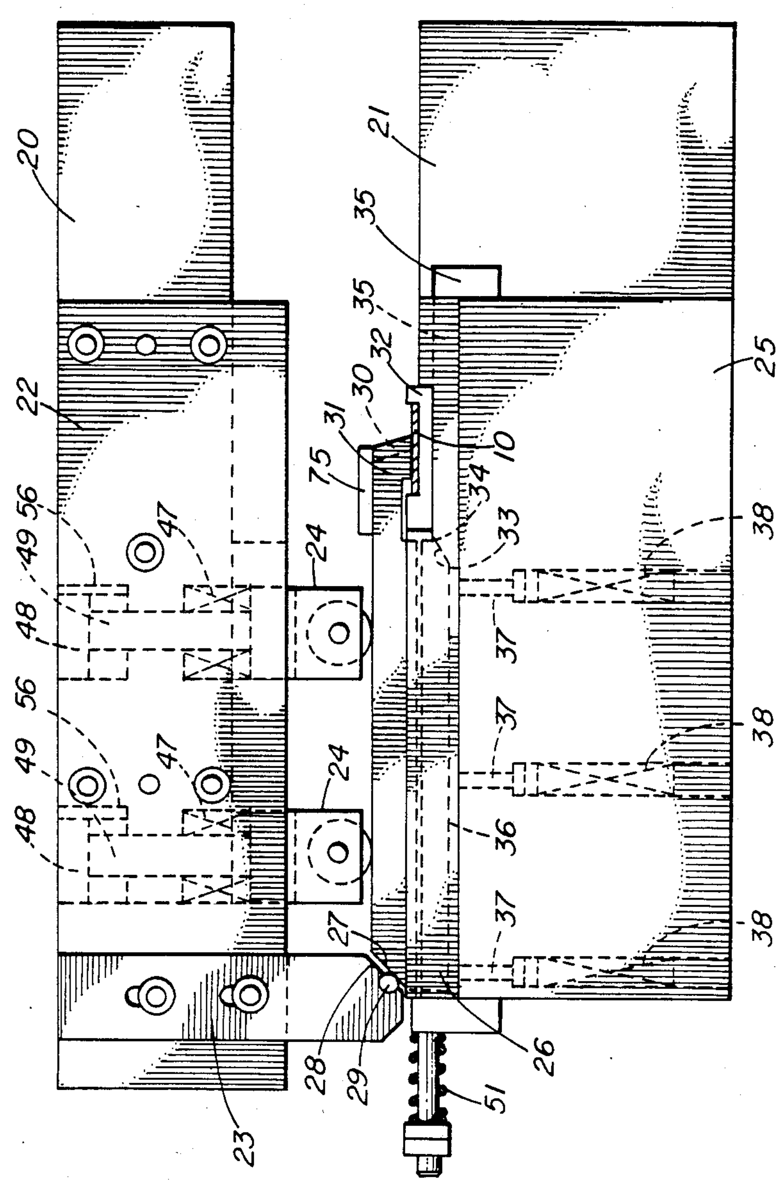
FIG. 6 is a similar view to that of FIG. 5, but part way through a broaching stroke.
Figure 7:
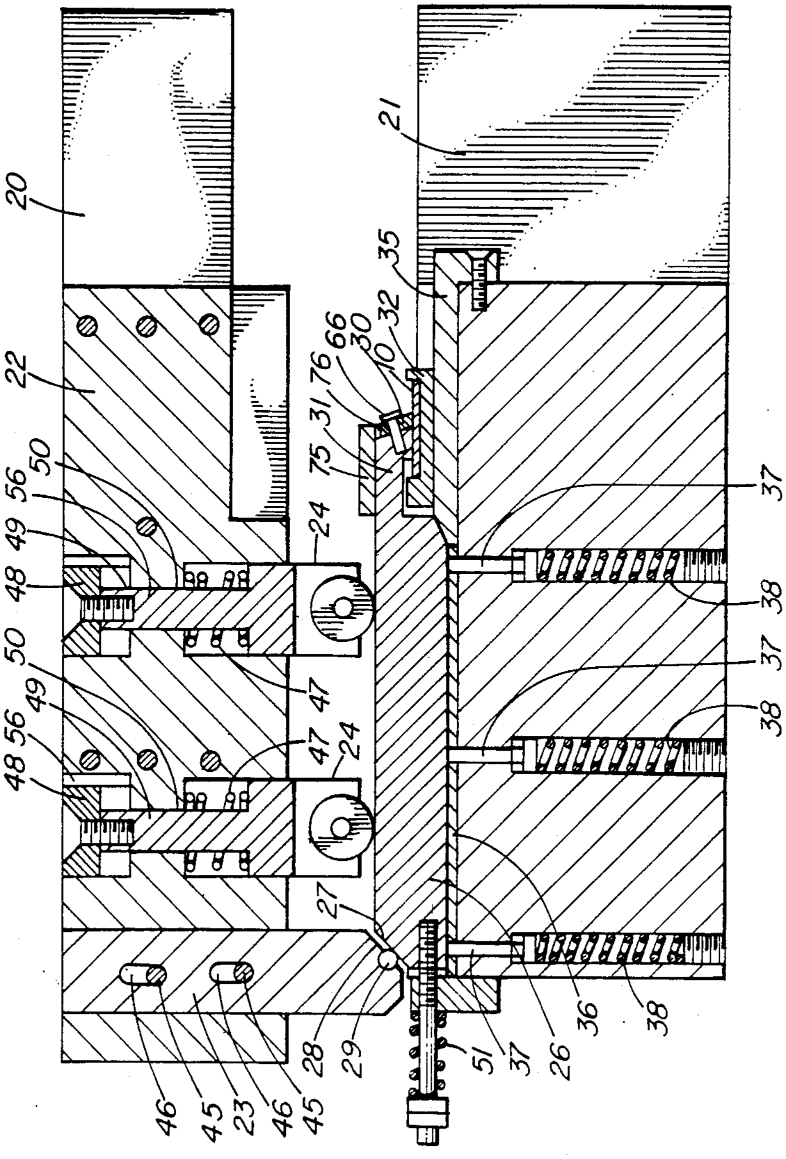
FIG. 7 is a cross-section on the line VII—VII of FIG. 8.

In FIGS. 5, 6, and 7, the main punch shoe of the stamping die is seen at 20. The die shoe is shown at 21. The broaching apparatus is mounted on the end surfaces of the two shoes, being the inlet end of the stamping die. On the punch shoe is mounted the punch holder 22. The punch holder has a cam punch 23 adjustably mounted at one end and also has two spring biased pressure members 24. On the die shoe is mounted a die block 25, on the top surface of which is slideably mounted a broach tool holder 26. At one end, for convenience referred to as the back end, the tool holder has an inclined surface 27. A similarly inclined surface 28 is formed on the lower end of the cam punch 23. A roller 29 is mounted in the inclined surface 28 and is in contact with inclined surface 27. At the opposite end of the tool holder, referred to as the front end, is mounted a tool bit 30. This will be described in more detail later. The front end, 31, cantilevers over a channel member 32 in which slides the terminal strip 10. The channel member is mounted in a recess in the top of the die block 25.

At the position where the front end 31 of the tool holder 26 cantilevers, there is formed an inclined surface 33 which engages with a similarly inclined surface 34 on the inner end of an insert 35 mounted on the die block 25. To reduce friction between the tool holder 26 and the die block 25 there is provided a strip 36, for example a strip of porous bronze containing a lubricant or a strip of lubristic plated tool steel. Pressure pins 37 biased by compression springs 38 extend up through the die block 25, through strip 36 and push against the bottom surface of the tool holder 26.

The invention operates as follows. The stamping die, to which the apparatus is mounted, is reciprocated up and down by the press, and in turn reciprocates the punch shoe up and down. In the uppermost position the cam punch 23 is just clear of the tool holder 26. The vertical position of the cam punch, relative to the punch holder 22, can be adjusted by the screws 45 in slots 46. The pressure members 24 are pushed down to their lower positions by springs 47, their downward motion being limited by cap members 48 attached to the central rods 49 of the pressure members. The rods 49 slide and locate in bores 50. The tool holder 26 is in the withdrawn position, that is to the left as in FIG. 5, under the action of compression spring 51. The back end of the tool holder is in contact with stop 52. This locates the initial contact between tool and strip. The tool holder is also lifted up slightly by the pressure pins 37. This lifting raises the cutting edges of the cutting tool 30 clear of the terminal strip 10. Thus, at the start of a press stroke, the tool holder 26 is to the left and raised up, the cam punch 23 clear and the pressure members 24 down.

As the press stroke progresses, moving the punch shoe 20 down, the pressure members move into contact with the top surface of the tool holder. This is as in FIG. 5. Continued downward movement of the punch shoe 20 moves the punch holder 22 down. The pressure members push down on the tool holder, pushing down the pressure pins 37 and moving the cutting edges of the cutting tool into the terminal strip 10. Further downward movement of the punch shoe and punch holder pushes down the cam punch 23 and roller 29 contacts the surface 27. Further, continued movement causes the roller 29 to move down the inclined surface 27 causing the tool holder to slide, to the right in FIGS. 5, 6, and 7, starting broaching of the inlay. The punch shoe and punch holder continue to move down, with further sliding of the tool holder and continued broaching the precious metal stripe, until the inclined surface 33 on the tool holder 26 meets the inclined surface 34 on the insert 35. This is as in FIG. 6 and FIG. 7.

The final downward movement of the punch shoe and punch holder continues sliding of the tool holder 26 but now the inclined surface 33 slides up surface 34. This causes the front end 31 of the tool holder to lift up causing the cutting edges to move up as they move across the strip. The cutting edges eventually move clear of the strip.

Thus, broadly stated, the process or method of removing the inlay at spaced predetermined positions comprises moving the broaching tool down to insert one or more cutting edges into a strip of terminal material on a first side of an inlay stripe; traversing the tool across the strip, the cutting edges removing the inlay stripe; moving the cutting edges upward at the other side of the inlay stripe while maintaining a transverse movement; and moving the broaching tool upward and returning the tool to its original position. After removal of the inlay stripe, the terminal strip is moved forward a predetermined amount and the method repeated. The cutting edges can be given a transverse movement as they are inserted into the strip.

While the removal of a precious metal stripe which is fully inlaid has been described, the process, and apparatus, is also fully applicable to the removal of an inlay stripe which is only partly in the terminal strip and which extends partly above the surface of the strip, as indicated in dotted outline 12*a* in FIGS. 3 and 4.

On the return stroke of the press, the punch shoe 20 and punch holder 22 move up together with the cam punch 23. Pressure pins 37 push up the tool holder 26 and the spring 51 moves the tool holder back against the stop 52. Adjustment of the tool holder position is obtained by grinding the end of the tool holder or the stop 52, and by using shims.

Figure 8:
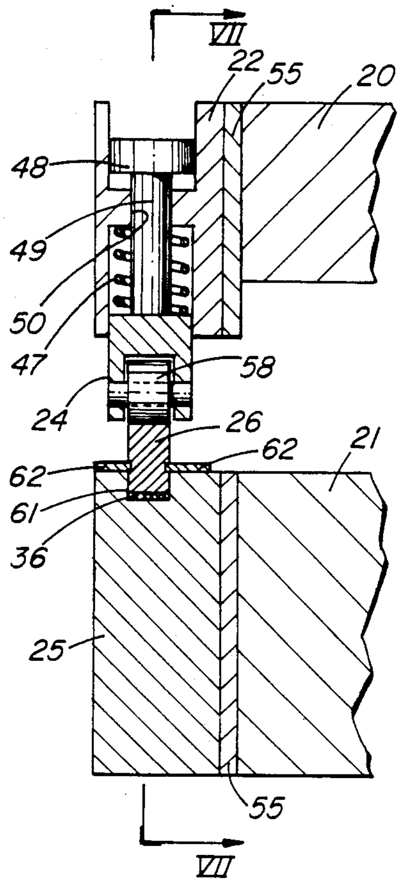
FIG. 8 is a cross-section on the line VIII—VIII of FIG. 5, with the movement of the apparatus at an intermediate position.

FIG. 8 is a transverse cross-section through the apparatus, at a position where the pressure members 24 have started to move up, in the punch holder 22, having pushed the tool holder 26 down onto the strip 36. Depending upon the particular form of terminal being produced, the distance between the center line of the broaching tool of the invention and the forming members of the terminal forming punch may vary. This variation is provided by spacer members 55. The thickness of spacer members can be varied to vary the relative position of the broaching tool.

Figure 9:
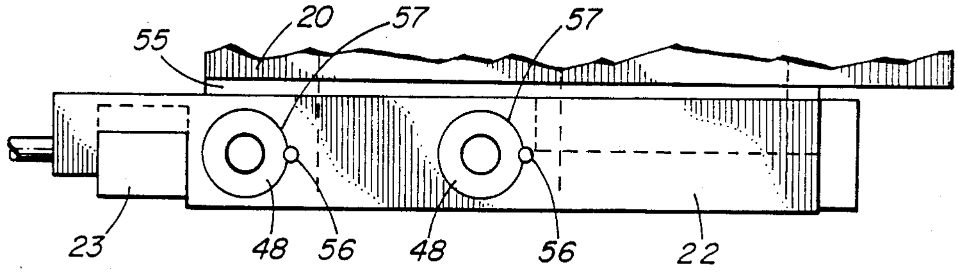
FIG. 9 is a top view of the tool in the direction of arrow B in FIG. 5.

FIG. 9 is a view looking down on the top of the punch holder 22. The cap members 48 are shown. Also shown are small cylindrical dowels 56 which extend between the cap members and the enlarged bores 57 in which the cap members move axially. The dowels 56 ensure that the pressure members 24 are always positioned so that the rotary axes of rollers 58 in the pressure members 24 is transverse to the length of the tool holder 26.

Figure 10:
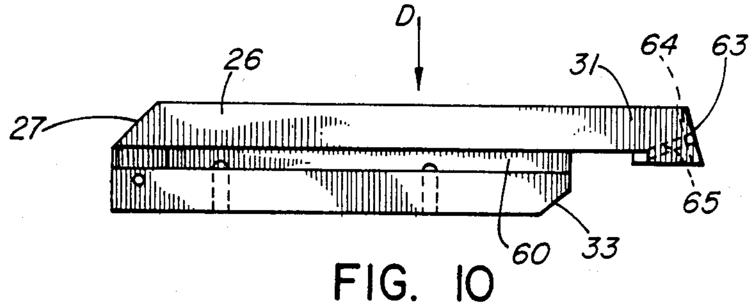
FIG. 10 is a side view of the cutting tool holder as used in the apparatus of FIGS. 1 to 9.
Figure 11:
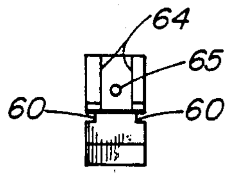
FIGS. 11 and 12 are end and top views in the directions of arrows C and D respectively of FIG. 10.
Figure 12:
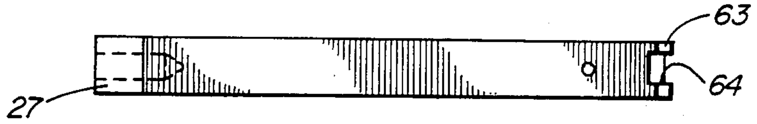

FIGS. 10, 11, and 12 illustrate one form of tool holder 26. A groove 60 extends along each side of the tool holder and when in position on the die block 25, the lower part of the tool holder is positioned in a groove in the top surface of the die block, seen at 61 in FIG. 8. Two retainer members 62 are mounted on the die block and extend into the grooves 60 as seen also in FIG. 8. There is sufficient clearance between retaining members 62 and the grooves 60 to permit the vertical movement of the tool holder. In the front surface 63 of the tool holder is formed a shallow recess 64. This holds a cutting tool, illustrated in FIGS. 13, 14, and 15. The tool is held by a screw passing through cut and threaded hole in the tool holder—at 65, the screw indicated at 66 in FIG. 7. In the examples of FIGS. 10, 11 and 12, the recess 64 is shown inclined. This recess can be vertical, the tool itself being suitably shaped to give the desired angle at the cutting edges.

Figure 13:
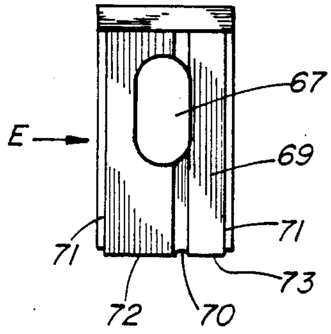
FIG. 13 is a front view of a cutting tool.
Figure 14:
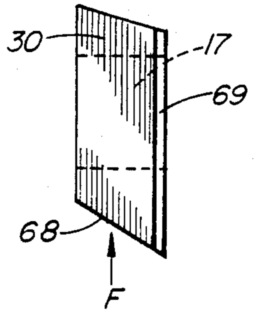
FIG. 14 is a side view in the direction of arrow E of FIG. 13.
Figure 15:
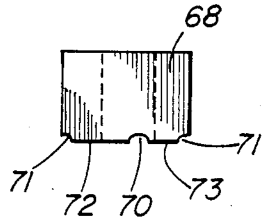
FIG. 15 is an end view in the direction of arrow F of FIG. 14.

The cutting tool 30 is illustrated at a larger scale, in FIGS. 13, 14, and 15. The tool 30 is for example of sintered carbide and can be resharpened. The tool is of rectangular cross-section to fit in the recess 64 in the tool holder. An elongate hole 67 extends through the tool, the screw 66 (FIG. 7) extending through the hole. The vertical position of the tool 30 in the holder 26 can be adjusted by the screw 66 and hole 67. The front end 68 of the tool is chamfered or inclined to form a cutting edge. The bottom surface 69 has a central groove 70 and side recess 71. These divide the cutting edge into two portions 72 and 73. These portions can be of different widths, as shown, or the same width depending upon the width of the precious metal to be removed, that is the position indicated at 13 in FIGS. 1 and 2. More than two portions can be formed on a cutting edge, or of course only one portion.

As illustrated in FIGS. 5, 6, and 7, a holding member 75 is mounted on the front end of the tool holder, extending over the tool 30. This relieves the screw 66 of the vertical loads generated during cutting or broaching. As the tool is sharpened, packing shims are positioned between the top of the tool 30 and the holding member 75, to correctly position the cutting edge relative to the tool holder and give the desired depth of cut. Such shims are indicated at 76 in FIG. 7. As an alternative to using shims, a screw can be provided in the holding member 75 bearing down on the top end of the cutting tool 30. This screw can then be used to position the tool 30.

Figure 17:
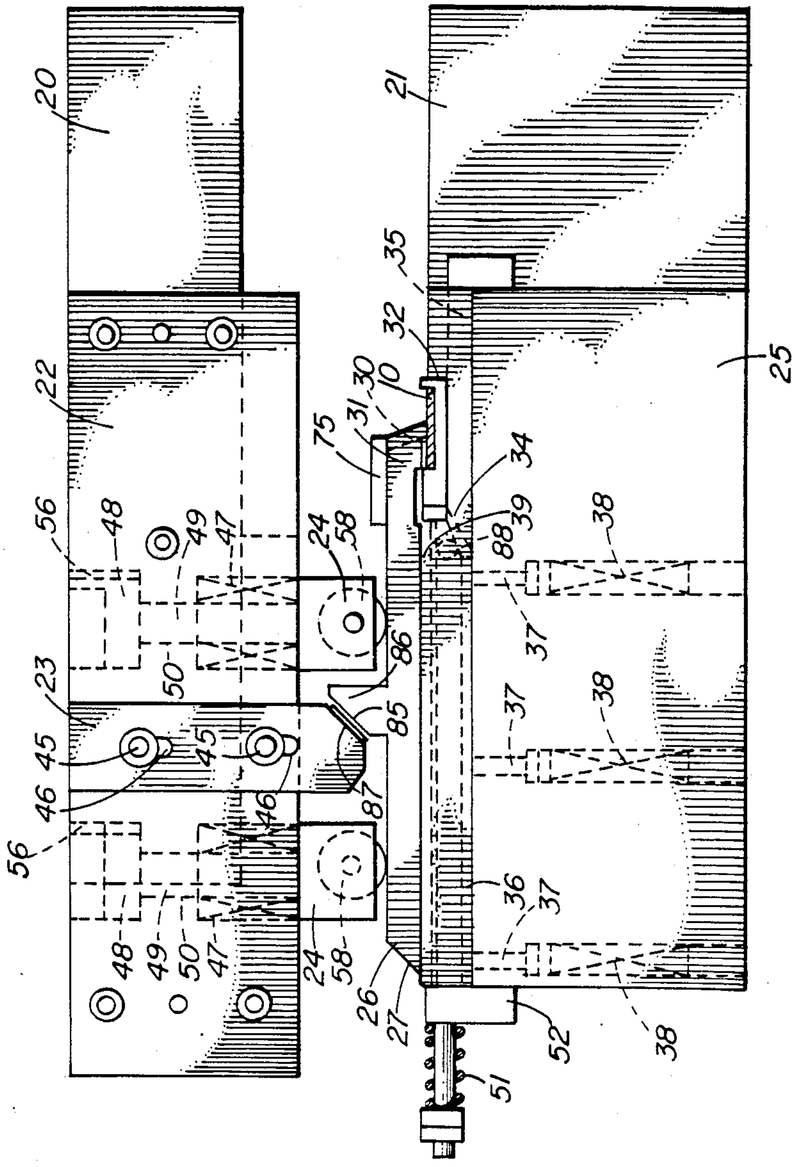
FIG. 17 is a view similar to that of FIG. 5, illustrating a modified tool.

An alternative arrangement of the tool is illustrated in FIG. 17, the same reference numerals being used for the same items. Instead of being mounted towards one end of the punch holder 22, the cam punch 23 is mounted at an intermediate position, for example between the pressure members 24. A cam surface 85 is formed on upward projection 86 on the top of the tool holder 26. The operation is the same as for the arrangement in FIGS. 5, 6 and 7, FIG. 17 being a modification of the arrangement as in FIG. 5. A further modification is that instead of a roller 29 in the inclined surface 28, this surface has a layer of sintered carbide 87 attached to it, as by brazing. A further modification which can be made is to insert a roller in the surface 33 at the front end of the tool holder, the roller indicated in dotted outline at 88.

The cam punch can be inset in a recess or groove in the punch holder, as in FIGS. 5, 6 and 7, or can be mounted on the side surface of the punch holder with the lower end of the cam punch, with the inclined surface 28, extending across under the punch holder.

An inclined surface 27 can also be provided at the end of the tool holder, as illustrated in FIG. 17, the tool holder then being equally usable with punch holders having the cam punch at the end or at an intermediate position.

In a further alternative, instead of the tool cutting edges being pushed into the strip before transverse movement of the tool holder, a simultaneous downward and transverse motion can be applied. This is obtained by arranging for the roller 29, in FIG. 5, inclined surface 28 if no roller is provided, to contact the surface 27 as the pressure members 24 start to push the tool holder 26 down against the springs 38.

Figure 16:
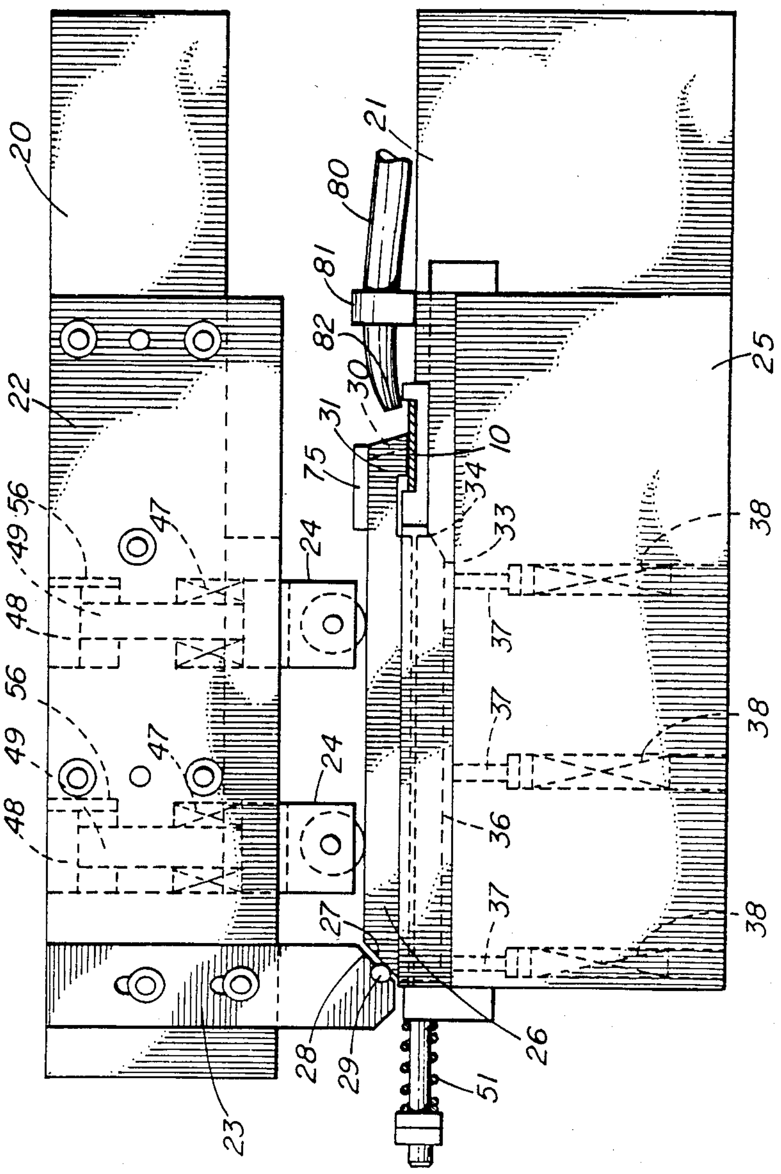
FIG. 16 is a similar view to that of FIG. 6, illustrating a collecting means for removed material.

The press operates at a very high speed, for example approximately up to 10 cycles a second. Thus the movement of the tool holder is extremely rapid. The small pieces of metal removed by the tool 30 are also moving fast when they are separated from the strip. To ensure that these pieces do not get transferred to other parts of the punch in the press, which could cause jamming and damage, it is desirable to provide some form of collection device. One way is to provide a suction tube having an inlet positioned close to the stroke end position of the tool. This is illustrated in FIG. 16. A tube 80, for example of flexible plastic, extends from a storage chamber not shown, to a position closely adjacent to the stroke end position of the tool 30, held in position by a bracket 81. The inlet end of the tube, indicated at 82, can usefully be made oval in shape. A sub-atmospheric pressure is maintained in the storage chamber and this creates a suction at the end 82 of the tube 80. Other ways of collecting the removed pieces can be used. For example, as the pieces leave the tool with a substantial velocity, it is possible to arrange a collecting member with an inlet opening positioned so that the pieces will be projected into the inlet opening. Once in the collecting member, the pieces can be caused to collect by gravity, or by blowing with an air jet, or other means.

The cutting tool 30, as stated, is capable of being positioned very accurately. This is essential as the inlay of precious metal 12 in FIGS. 1 and 2, is about 0.1 microinches thick. The strip 10 is about 8.5 microinches thick. The depth of cut by the tool is about 0.5 microinches. It has been found that the material removed has a composition generally as follows:—gold about 22%, silver about 7½% , and platinum about 2%, the remainder being the base or terminal material of the strip. This is a very high content level of precious metal. Refining and recovery costs are therefore very low.

While it is a distinct advantage to have the tool mounted on the same punch shoe of the press as also carries the terminal forming tools, it may be desired to provide the strip with the inlay already broached. Thus the strip manufacturer could carry out the broaching to remove unwanted precious metal, the treated strip being supplied to the terminal manufacturer. In this event it would be necessary for the strip manufacturer to perforate the strip, as at 11 in FIGS. 1 and 2, to ensure accurate alignment to the forming tool or tools.

The operation of the tool would be in the same manner as described above.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of removing a portion of at least a partially inlayed stripe at spaced predetermined positions along a metal strip, comprising:

(a) moving a broaching tool having at least one cutting edge;

(b) inserting said cutting edge into the strip outside of and adjacent to one of two sides of the inlay stripe;

(c) traversing said tool across the strip, said cutting edge cutting the inlay stripe;

(d) moving said cutting edge upward while maintaining the transverse movement of said tool;

(e) exiting said cutting edge from the strip outside of and adjacent to the other side of the stripe, removing a localized portion of the stripe;

(f) returning said tool to its original position, said cutting edge clear of the strip.

2. A method as claimed in claim 1, including stepping the strip forward a predetermined distance and repeating the operation.

3. A method as claimed in claim 1, including starting the traversing of said tool prior to inserting said cutting edge into the strip.

4. A method as claimed in claim 1, wherein said tool has two spaced cutting edges, and removing two localized portions of said stripe on said transverse movement of said tool, with said two cutting edges.

5. Apparatus for removing a portion of at least a partially inlayed stripe at spaced predetermined positions along a metal strip, comprising:

a broaching tool, said tool having at least one cutting edge;

a support member slidingly supporting said tool for transverse movement across said strip, from a first position to a second position;

resilient means for pushing said tool into sliding contact with said support member;

an actuating member for moving said tool in said transverse direction;

means for raising said cutting edge when said tool is approaching said second position;

resilient means for lifting said tool away from said support member; and means for returning said tool to said first position.

6. Apparatus as claimed in claim 5, including means for stepwise feeding the metal strip in a direction normal to said transverse direction.

7. Apparatus as claimed in claim 5, wherein said tool has two cutting edges spaced apart.

8. Apparatus as claimed in claim 5, wherein said resilient means for pushing said tool into sliding contact with said support member includes a plurality of spring loaded pressure members.

9. Apparatus as claimed in claim 5, including an inclined surface on said actuating member and a cooperative inclined surface on said tool, wherein movement of said actuating member towards said tool engages said inclined surfaces to move said tool.

10. Apparatus as claimed in claim 5, wherein said means for raising said cutting edge includes an inclined surface on said tool adjacent to said cutting edge and an inclined surface on said support member, whereby engagement of said inclined surfaces when said tool approaches said second position raises said cutting edge.

11. Apparatus as claimed in claim 5, wherein said means for returning said tool to said first position comprises an extension on an end of said tool remote from said cutting edge, abutment at the outer end of the extension and a compression spring extending between said abutment and said support member.

12. Apparatus as claimed in claim 9, wherein said cooperative inclined surface on said tool is positioned intermediate the ends of said tool, and including a spring loaded pressure member on both sides of said cooperative inclined surface for pushing said tool into sliding contact with said support member.

* * * * *